United States Patent [19]

Saito et al.

[11] Patent Number: 5,161,135

[45] Date of Patent: Nov. 3, 1992

[54] MAGNETO-OPTICAL DISC MEMORY APPARATUS INCLUDING A HEADER SIGNAL AND MAGNETO-OPTICAL SIGNAL LEVEL ADJUSTING CIRCUIT

[75] Inventors: Atsushi Saito, Ichikawa; Masahiro Ojima, Nerima; Masaru Ito, Sagamihara, all of Japan

[73] Assignee: Hitachi, Ltd., Tokyo, Japan

[21] Appl. No.: 617,006

[22] Filed: Nov. 21, 1990

Related U.S. Application Data

[60] Division of Ser. No. 53,564, May 21, 1987, Pat. No. 4,985,881, which is a continuation of Ser. No. 685,123, Dec. 21, 1984, abandoned.

[30] Foreign Application Priority Data

Dec. 23, 1983 [JP] Japan .................. 58-242006
Jun. 29, 1984 [JP] Japan .................. 59-133156

[51] Int. Cl.⁵ .............. G11B 13/04; G11B 11/12; G11B 11/10
[52] U.S. Cl. .................. 369/13; 369/124; 369/54; 360/59; 360/114
[58] Field of Search ............ 369/13, 116, 275.4, 369/54, 124, 275.2, 109, 44.13, 44.14, 44.25, 44.26; 360/59, 114; 365/122; 428/694, 621

[56] References Cited

U.S. PATENT DOCUMENTS

| | | | |
|---|---|---|---|
| 4,390,660 | 6/1983 | Ohta et al. | 428/621 |
| 4,443,870 | 4/1984 | Hazel et al. | 369/275.4 |
| 4,535,439 | 8/1985 | Satoh et al. | 369/275.4 |
| 4,566,088 | 1/1986 | Yoshida et al. | 369/275.2 |
| 4,985,881 | 1/1991 | Saito et al. | 369/13 |
| 4,999,824 | 3/1991 | Fuji et al. | 369/13 |

FOREIGN PATENT DOCUMENTS

| | | | |
|---|---|---|---|
| 2321164 | 3/1977 | France. | |
| 57-78653 | 5/1982 | Japan | 360/59 |
| 59-60742 | 4/1984 | Japan | 369/54 |
| 59-77648 | 5/1984 | Japan | 369/13 |
| 60-164939 | 8/1985 | Japan | 369/275.4 |
| 61-253656 | 11/1986 | Japan | 360/114 |

Primary Examiner—Hoa Nguyen
Attorney, Agent, or Firm—Antonelli, Terry Stout & Kraus

[57] ABSTRACT

A record carrier for recording, reproducing and erasing information. A circular disc-like substrate has a recording layer thereon such that information is written onto the recording layer by changing the direction of magnetization. A guide groove of a plurality of tracks is formed in advance and extends in the radial direction with intervals therebetween. Each track of the guide groove is divided into a plurality of sectors, each of which includes a header portion in which a header signal containing an address for distinguishing at least said sector is formed in advance with pits of a phase structure and a data portion adjacent to said header portion. The guide groove serves as an optical guide for a light beam which records, reproduces and erases information onto the data portion. A first detection system for detecting the light intensity of the reflected light from the record carrier and a second detection system for detecting the direction of polarization of the reflected light from the record carrier, and a level adjustment circuit for adjusting the levels of the header signal detected by the first detection system and the data signal detected by the second detection system are incorporated in this apparatus, whereby recording, reproducing and erasing information of any number of sectors are enabled.

11 Claims, 4 Drawing Sheets

MAGNETO-OPTICAL DISC MEMORY APPARATUS INCLUDING A HEADER SIGNAL AND MAGNETO-OPTICAL SIGNAL LEVEL ADJUSTING CIRCUIT

This application is a divisional of application Ser. No. 053,564, filed May 21, 1987, now U.S. Pat. No. 4,985,881 which is a continuation application of parent application Ser. No. 685,123, filed Dec. 21, 1984, now abandoned.

BACKGROUND OF THE INVENTION

This invention relates to an apparatus and record carrier for a magneto-optical disc memory, and more particularly to an apparatus and record carrier for a magneto-optical disc memory which can process (record, reproduce or erase) information on any number of tracks or sectors at a time.

Further, this invention relates to a master disc cutting apparatus for forming a guide groove and a header signal in advance such as to enable the processing of information on any number of tracks or sectors at a time.

An apparatus and record carrier for a magneto-optical disc memory is an erasable optical information memory apparatus which records and erases information by utilizing what is called light induced thermo-magnetic effect, namely by irradiating a beam converged by a laser onto a recording medium of perpendicular magnetic thin film, cancelling magnetization temporarily by the heat of the optical energy, and setting the magnetization of the magnetic thin film in a predetermined direction by applying magnetization from outside, and which reproduces information by utilizing magneto-optic effect (for example, the Kerr effect and the Faraday effect), by rotating the direction of polarization of incident beam in correspondence with the direction of magnetization of the perpendicular magnetic thin film. An example of this apparatus is disclosed in pp. 208 to 214 of "Amorphous thin film disc for magneto-optical memory" by Y Togami et al, SPIE Vol. 329, Optical Disk Technology (1982).

When information is written successively into a rotating record carrier (magneto-optical disc) which has a perpendicular magnetic thin film provided on a disc substrate, it is necessary to record it at a constant pitch of, for example, 1.6 $\mu$m while keeping a regular interval between said information and the information already recorded. It is also necessary to make it possible for a user to freely record, reproduce and erase information at a desired position of a perpendicular magnetic thin film.

On the other hand, in a non-erasable optical disc, in which a laser beam is irradiated to the recording film to make a minute hole by heating and evaporating the irradiated minute portion, information is recorded and reproduced along a guide groove which has been formed in advance on the disc. One example thereof is disclosed in Japanese Laid-open Patent Application No. 91536/1983 (corresponding to U.S. Pat. No. 4,607,358). In this kind of optical disc, a header signal such as a track address or a sector address is recorded in the guide groove in advance, information can be recorded or reproduced at a desired position of any number of tracks or sectors by conducting random access to a specific track or a specific sector in the track. Data which a user wants to record is recorded by making a minute hole in a recording film in the groove by irradiating a high-power laser beam.

However, in the case of a magneto-optical disc, an apparatus and record carrier for magneto-optical disc memory which reproduces information by utilizing the light induced magneto-optic effect represented by the Kerr effect and the Faraday effect and which records and erases the information by the light induced thermo-magnetic effect, a method for controlling information of any number of sectors such as described before has not been established.

For example, a method by which a header signal is recorded in advance by the direction of magnetization may be considered. However, by this method, recording has to be conducted by irradiating a laser beam onto each disc one by one, which would be inconvenient for mass production. In addition, there is a risk of mistakenly erasing a header signal. Further, one and the same apparatus does not suffice for handling a conventional non-erasable optical disc, and an optical disc for exclusively reproduction such as a digital audio disc (DAD) or a video disk (VD) and a magneto-optical disc.

In Japanese Laid-open Patent Application No. 218033/1983 a magneto-optical disc is disclosed in which a guide groove is provided in order to conduct secure tracking by the three-spot method and which records magnetic data in the guide groove. However, nothing is disclosed with respect to a header signal, nor is information control of any number of tracks or sectors taken into consideration.

SUMMARY OF THE INVENTION

Accordingly, it is an object of the invention to provide an apparatus and record carrier for a magneto-optical disc memory which can process information of any number of tracks or sectors.

It is another object of the invention to provide an apparatus and record carrier for a magneto-optical disc memory which can also handle a conventional non-erasable optical disc and an optical disc for exclusively reproducing such as a digital audio disc (DAD) or a video disk (VD).

It is a further object of the invention to provide a master disc cutting apparatus for forming in advance a guide groove and a header signal such as to enable the processing of the information of any number of tracks or sectors.

In this invention, a header portion of a magneto-optical disc has pits (it is a phase structure). That is, a header signal such as a track address, or a sector address is formed in advance on a recording medium (a perpendicular magnetic thin film) with a plurality of concave or convex pits of variable or uniform size. When a light beam irradiates these concave or convex pits, the reflected light from the concave or convex pits is diffracted, and a diffracted reflection is obtained which has a phase different from the reflection light obtained when a light beam irradiates a flat portion surrounding the concave or convex pits. This diffracted reflection is converted to the light intensity and thus a header signal is detected.

On a magneto-optical disc according to the invention, an optically detectable guide groove which works as an optical guide for enabling an exact scanning of a light beam along its rotational direction is formed in advance in a spiral or concentric form. Header portions are intermittently provided along the guide groove and the data which a user records is recorded onto the perpendicular magnetic thin film between the header portions along the guide groove by utilizing the light induced thermo-magnetic effect. The information recorded on each data portion between the header portions is reproduced by utilizing the magneto-optic effect whereby the direction of polarization of a reflection light rotates in the opposite direction in correspondence with the upward or downward direction of magnetization. The information in the data portion is erasable because it is recorded by utilizing the light induced thermo-magnetic effect, but the information in the header portion cannot be erased because it is in the form of pits of a phase structure, so that there is no danger of it being erased by a user. Therefore, a user can record information onto a desired data portion, and reproduce or erase it freely by random access to the header signal.

The plurality of concave or convex pits which are incorporated the header portion may be formed either in a guide groove, or the flat portion between guide grooves. Particularly, in the case of a magneto-optical disc, the recording medium of which is a perpendicular magnetic thin film and which reproduces information by detecting not greater than one degree of rotation of the direction of polarization, it is preferable from the viewpoint of strengthening the polarity S/N to form a header signal in the flat portion between guide grooves in advance and to record information in the data portion also in the flat portion between the guide grooves also. The surface of the perpendicular magnetic thin film on the guide groove has a larger amount of minute unevenness and a higher surface noise level than the perpendicular magnetic thin film on the flat portion between the guide grooves. This is considered to have some relation to fluctuation in the light intensity of a laser beam providing light for groove cutting at the time of producing a master disc or fluctuation in photoresist developing. By recording information between the guide grooves , it is possible to keep the surface noise level low and to strengthen the polarity S/N.

A disc moves vertically during rotation with a tolerance of ±100 μm at the largest. For the purpose of reliable recording, reproduction and erasing of information, it is necessary to control the focal point automatically such that the focal point of a focussing lens traces the vertical motion of the disc at a tolerance of not greater than ±1 μm and a light spot is stably formed. Further, a disc may undulate horizontally during rotation due to the radial runout with a tolerance of ±100 μm at the largest. Therefore it is necessary to control tracking such that a light spot successively scans information along the guide groove with an accuracy of not greater than ±0.1 μm tolerance. In an apparatus and record carrier for a magneto-optical disc memory according to this invention, a single light spot suffices for detecting these kinds of signals (focal signal and tracking signal), reading a header signal, and recording, reproducing or erasing information in the data portion.

As described above, the header signal recorded in the header portion as concave or convex pits is detected as a change in quality of the light reflected from the disc, and, on the other hand, the data signal recorded in the data portion by the direction of magnetization is detected after converting the rotation of a plane of polarization resulting from the magneto-optic effect to the light intensity. Therefore, the levels of the two reproduction signals are different. In an apparatus and record carrier for a magneto-optical disc memory according to this invention a level adjustment circuit is provided for equalizing the levels of the header signal and the data signal which are detected by the respective photodetectors.

In order to form a master disc of a record carrier according to the invention, a master disc cutting apparatus according to the invention is designed such that a laser beam for forming header pits and a laser beam for forming guide grooves are arranged to enter simultaneously, and each of the laser beams is modulated separately. When the header signal pits are formed in the guide groove, they are formed by modulating the light intensity of only one laser beam in correspondence with a header signal overlapped with a biased signal for forming a guide groove with a header signal. When the header signal pits are formed between the guide grooves, two laser beams are converged onto a master disc at a regular radial interval, the intensities of both beams are modulated in proportion to the distance from the center of the master disc, and further, both beams are subjected to pulse modulation in correspondence with the header pit forming signal, whereby the guide grooves and header signal pits are formed simultaneously. This master enables mass production of a record carrier with guide grooves and header signals in accordance with the invention by the known replication method.

BRIEF DESCRIPTION OF THE DRAWINGS

FIGS. 3a, 3b are perspective views of parts of the recording mediums (perpendicular magnetic thin film) of a magneto-optical disc, in which:

DESCRIPTION OF THE PREFERRED EMBODIMENTS

Figure 1:
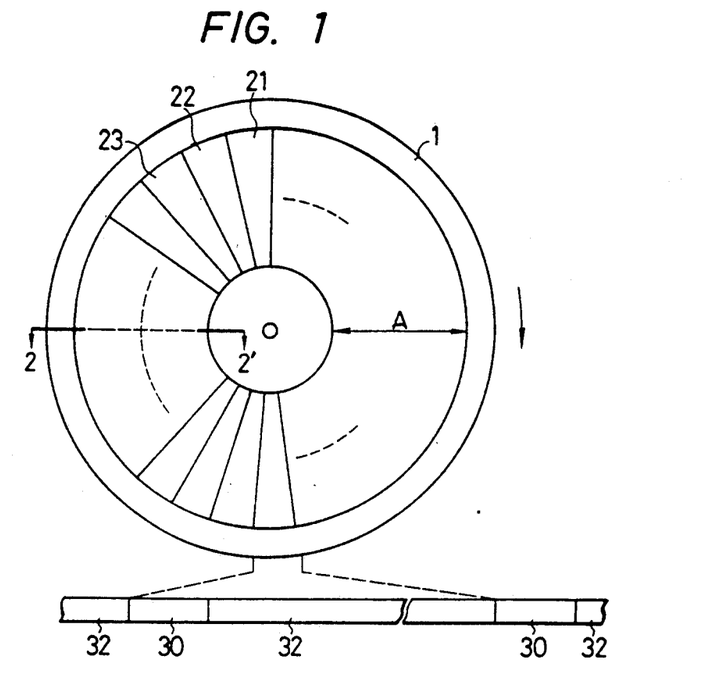
FIG. 1 is a plan view of an embodiment of a magneto-optical disc according to the invention.

FIG. 1 is a plan view of an embodiment of a record carrier (a magneto-optical disc) according to the invention. A range A indicated by the arrow denotes a recording area, in which a guide groove in spiral or concentric form (shown in FIGS. 2, 3a and 3b) is provided in advance at a constant pitch, for example, at a pitch of 1.6 μm. The length of this guide groove for the extent of one rotation (it is called a "track") is divided into a multiplicity of, for example, 64 areas, 21, 22, 23 . . .

These areas are called sectors, one of which represents the minimum unit for writing, reading, and erasing information. Each of the sectors 21, 22, 23 ... has a header portion 30 in which the contents necessary for controlling information in said sector such as a track address for discerning a track or a sector address for distinguishing said sector are provided as a line of concave or convex pits 31 (shown in FIGS. 3a and 3b) and a data portion 32 in which a user records information by utilizing the light induced thermo-magnetic effect.

Figure 2:
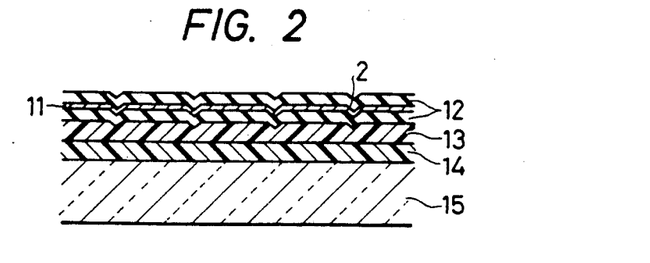
FIG. 2 is a sectional view of the embodiment shown in FIG. 1 taken in the radial direction.

In FIG. 2 which illustrates a radial sectional view of a record carrier, the referential numeral 11 denotes a recording film, for example, a perpendicular magnetic thin film, the main component of which is Tb—Fe and which is about 1,000 Å thick. This perpendicular magnetic thin film 11 is inserted between an upper protector layer 12 and a lower protector layer 12, each of which consists of $SiO_2$ and is about 1400 Å thick. A substrate 15 is a transparent glass or plastic plate about 1 mm thick, over which a layer of ultra-violet light cured resin 14 and a layer of nitrate cellulose 13 are laid. Thereafter on top of them the perpendicular magnetic thin film 11 with the protector layers 12 thereon and thereunder is provided.

Figure 3A:
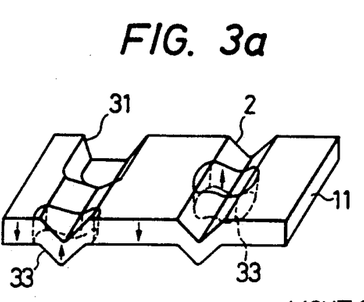
FIG. 3a shows an example of a recording medium with a header signal and a data signal recorded in the guide grooves.
Figure 3B:
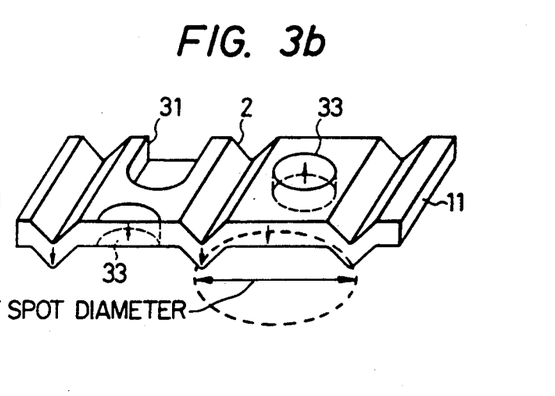
FIG. 3b shows an example of a recording medium in with a header signal and a data signal recorded in the flat portion between the guide grooves.

Parts of this perpendicular magnetic thin film are illustrated in FIGS. 3a and 3b. The section of the guide groove 2 is roughly in the shape of a triangle, and the depth is about ⅛ the wavelength of a laser beam used for recording and reproduction. For example, if the wavelength of the laser beam is 830 nm, the depth of the guide groove 3 is about 0.1 μm, and the width is approximately 0.5 μm. A header signal constituting a header portion 30 and containing a track address and a sector address is provided as a plurality of concave pits 31 of a variable or uniform size. Pits of variable sizes signify an address signal which has been subjected to pulse amplitude modulation and pits of a uniform size signify an encoded digital signal. The depth of the pits 31 is about ¼ the wavelength of a laser beam used for recording and reproduction. For example, if the wavelength of the laser beam is 830 nm, the depth of the pits is about 0.2 μm, and the width is approximately 0.8 μm. The header portion 30 consisting of a line of these pits may be formed in the guide grooves 2, as is shown in FIG. 3a but the sectors including the header portions are preferably formed in the flat portions between the guide grooves, as is shown in FIG. 3b.

The guide grooves 2 and header signal pits 31 are formed in the perpendicular magnetic thin film 11 in advance. For example, in a master disc with photoresist applied guide grooves and header pits are cut precisely with a laser beam, and they are transferred to a Ni stamper, and then to the nitrate cellose layer 13, whereby a disc substrate with the guide groove 2 and the header signal pits 31 formed is obtained. The record carrier shown in FIG. 2 is obtained by overlaying the disc substrate with the protection layer 12, the perpendicular magnetic thin film 11 and the protection layer 12 in that order.

Referring to FIGS. 3a, 3b, magnetic domains 33 which are to be recorded in the data portion 32 are illustrated. These magnetic domains 33 are recorded by irradiating a laser beam onto the perpendicular magnetic thin film 11, raising the temperature of the perpendicular magnetic thin film 11 locally so as to cancel the magnetization locally, applying the magnetic field oriented in the direction opposite to the direction of magnetization of the surrounding region from the outside to the portion where magnetization is cancelled and forming a domain having an opposite magnetization direction magnetization only in the portion on which the laser beam has been irradiated. In FIG. 3a, the data portion 32 is formed in the guide grooves 2 and the magnetic domains 33 are recorded in the guide grooves 2. In FIG. 3b, the magnetic domains 33 are recorded in the flat portions between the guide grooves 2. In the flat portion between the guide grooves, the surface noise level is lower than in the surface of the guide groove. Therefore, it is effective in terms of strengthening the polarity S/N to record the magnetic domain in the flat portions between the guide grooves. According to the experiments conducted by the inventors, by recording the magnetic domain in the flat portions between the guide grooves the polarity S/N is heightened by 3 dB compared to the case shown in FIG. 3a.

Figure 4:
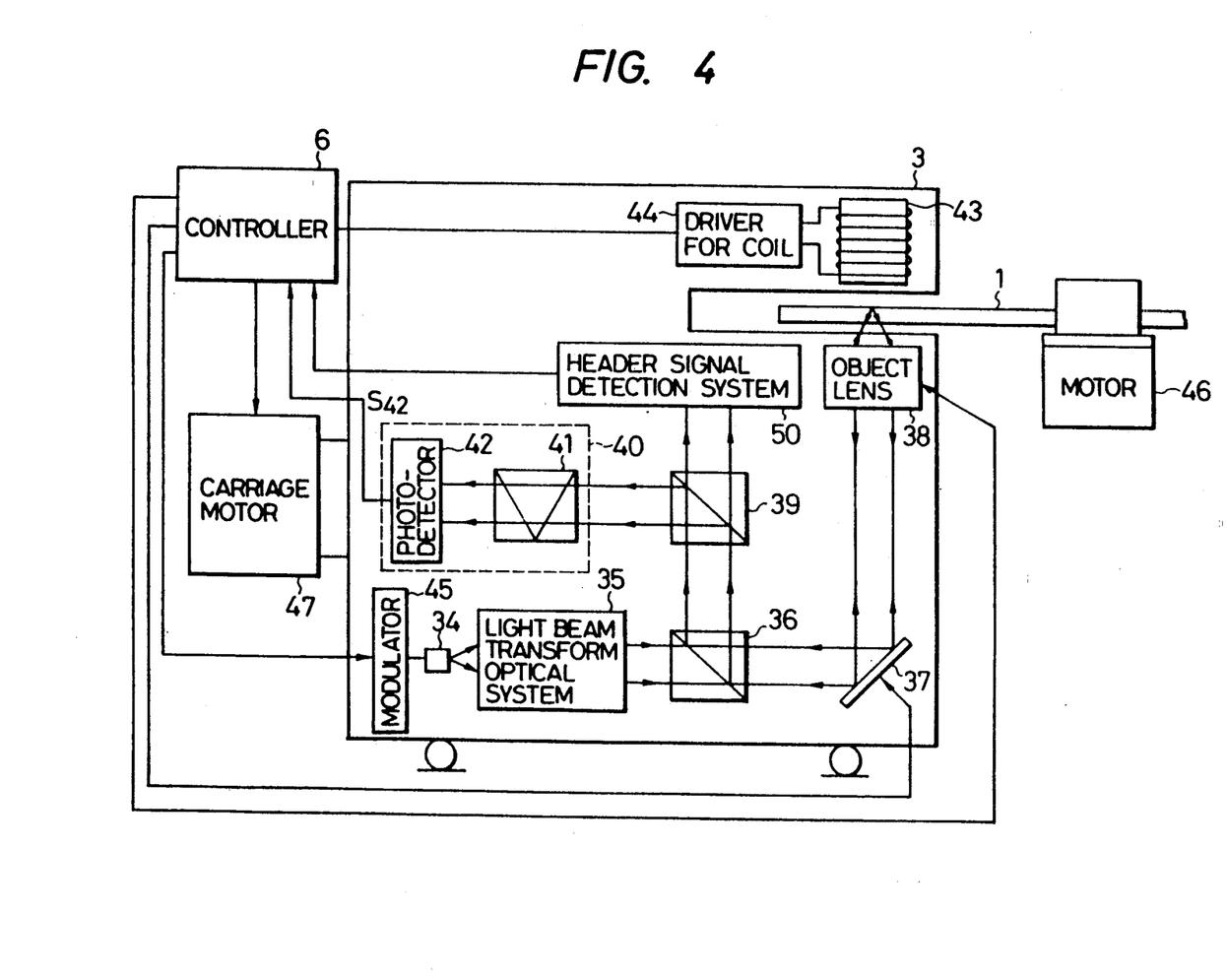
FIG. 4 is a block diagram showing an apparatus and record carrier for magneto-optical memory according to the invention.
Figures 5, 6:
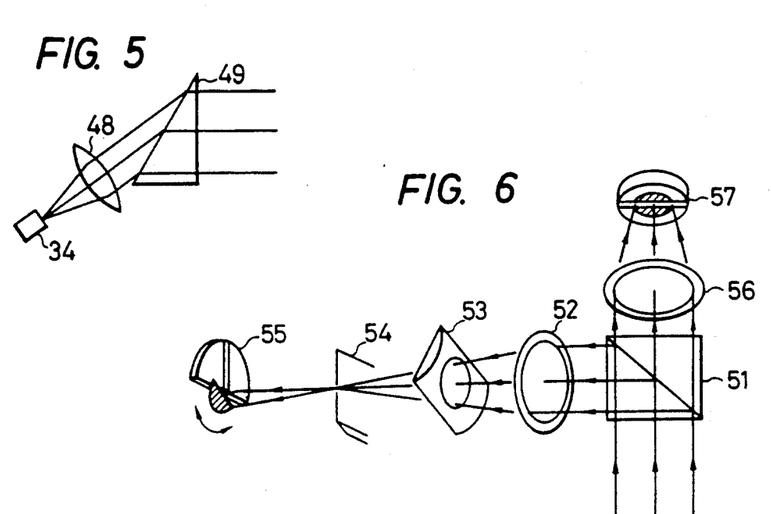
FIG. 5 shows an example of a light beam transform optical system of the apparatus shown in FIG. 4.
FIG. 6 shows an example of a header signal detecting system.

FIG. 4 is a diagram showing the structure of an apparatus for recording, reproducing and erasing information on a magneto-optical disc 1 shown in FIG. 1. The magneto-optical disc 1 is rotated by a motor 46. The referential numeral 3 represents a magneto-optic head for recording, reproducing and erasing information, and it can move to a desired position in the radial direction, namely to a desired track. The divergent laser beam having an elliptic section which emerges from a semiconductor laser 34 is converted into parallel beams of a circular section by a light beam transform optical system 35, passed through a polarization prism 36, reflected by a galvano mirror 37, and is converged by an objective lens 38 onto the perpendicular magnetic thin film 11 of the disc 1 as a minute spot. An example of the light beam transform optical system 35 is shown in FIG. 5. The divergent laser beam having an elliptic section which emerges from the semiconductor laser 34 is collimated into the parallel light beams by a spherical lens 48, and the distribution in the minor axial direction is enlarged by a prism 49 and converted into the parallel beams of a circular section. Such a light beam transform optical system is disclosed in U.S. Pat. No. 4,333,173. When it is not necessary to irradiate a circular spot, this optical system 35 is unnecessary.

The objective lens 38 is attached to a voice coil (not shown) such as to be moved in accordance with the vertical undulation of the disc 1. An electro-magnetic coil 43 which generates the magnetic field for erasing and recording information is provided opposite the disc 1. The reflected light from the disc 1 is passed through the objective lens 38 and the galvano mirror 37, and is reflected by the polarization prism 36, thereby being separated from the irradiated light. This reflected light is further separated by a beam splitter (polarization prism) 39. The light reflected by the beam splitter 39 is led to a magnetic data signal detection system 40, while the light which has passed through the beam splitter 39 is led to a header signal detection system 50. The numeral 6 denotes a control device for controlling the whole part of the apparatus; it controls a carriage motor, a modulation circuit 45 and a driver 44 for an electromagnetic coil 43, and in addition controlling in relation to recording, reproducing and erasing information is conducted by this device 6.

When a magnetic data signal is recorded, the drive current of the semiconductor laser 34 is modulated by a data signal in a modulation circuit 45, and the optical pulses corresponding to the information to be recorded are irradiated onto the perpendicular magnetic thin film 11 on the disc 1 such as to raise the temperature of the perpendicular magnetic thin film 11 locally. The rise of the temperature cancels the magnetization of the magnetic thin film locally, and to this demagnetized part is applied, by the electromagnetic coil 43, the magnetic field the direction of the magnetization of which is opposite to that of the surroundings, thereby forming a domain (the magnetic domain 33) having an opposite magnetization direction only in that portion in which the laser beam has been irradiated.

When the data signal which has already been written is erased, a predetermined current is fed to the semiconductor laser 34 so as to irradiate the perpendicular magnetic thin film 11 and to cancel the magnetization of the magnetic thin film temporarily. Thereafter magnetization in the direction opposite to the direction at the time of recording is applied by the electromagnetic coil 43, such as to re-orient the magnetization direction so that it corresponds with that of the non-recorded area in the surrounding region.

A magnetic data signal is reproduced by utilizing the magneto-optic effect represented by the Kerr effect. The Kerr effect is the effect whereby the direction of polarization of a reflection light slightly rotates in the opposite direction in correspondence with the upward or downward direction of magnetization of the perpendicular magnetic thin film.

The magnetic data signal detection system 40 is composed of an analyzer 41 and a photodetector 42. The analyzer 41 is an optical element which passes certain specific components of polarized light. Therefore, when light enters in which, due to the Kerr effect, the polarization direction is rotated, in correspondence to the existence of recording portions enters, it is arranged to emerge after being changed in terms of the quantity of light. The change in quantity of light is converted to an electrical signal by the photodetector 42, and the output $S_{42}$ is supplied to a level adjustment circuit in the controlling device 6 such that the level thereof is adjusted to the level of a header signal.

Next, the detection of the header signal will be described. Since the header signal is recorded as convex or concave pits, it is directly detected as a change in quality of the reflected light.

Therefore, a header signal detection system 50 employed only for detecting a header signal can be simply composed of the photodetector for converting the light which has passed through the beam splitter 39 into an electric signal. In this embodiment, however, the header signal detection system also serves as a focal signal detection system and a tracking signal detection system 50. This embodiment applies the push-pull method for tracking deviation detection and the image rotation method for focus deviation detection. FIG. 6 illustrates an example thereof. The light which has passed through the beam splitter 39 is introduced to the magnetic data signal detection system 40. For example, the light is further divided into two by a beam splitter 51 (e.g. a half prism), one being introduced to a circular divided photodetector 57 through a spherical lens 56, while the other being introduced to a semicircular divided photodetector 55 through an aspheric optical system consisting of a spherical lens 52 and a cylindrical lens 53 with part of it being obstructed by a knife-edge 54.

The numerals 52 to 55 are the focal signal detection systems. Since the semicircular light flux from the knife edge 54 rotates on the divided photodetector 55 in accordance with the focus deviation, a focal signal is obtained from the difference output. The focus is controlled by inputting the output of the divided photodetector 55 into an auto focusing servo circuit in the controlling device 6, and feeding the difference output back to the voice coil attached to the objective lens 38. This focal signal detection system is disclosed in U.S. Pat. No. 4,450,547.

The referential numerals 56 and 57 represent the tracking signal detection systems, and the divided photodetector 57 serves also as a header signal read-out device. The tracking signal is detected by utilizing diffraction of light by the guide groove 2. In the case of providing a header pit 31 in the guide groove 2, as is shown in FIG. 3a, it is necessary to situate the light spot exactly at the center of the guide groove 2. Now, supposing that a pitch of the guide groove is 1.6 μm and the diameter of the light spot is about 1.8 μm, when the light spot irradiates the guide groove 2, interference patterns of 0-order diffracted light and first-order diffracted light are observed on the divided photodetector 57 because the distribution of amplitude of the light spot spreads to the adjacent tracks on both sides. When there is no deviation of tracking, these patterns of interference are symmetric in relation to the guide groove, but, on the other hand, when a tracking deviation is generated, the patterns of interference lacks symmetry, and therefore the difference output does not become zero. Tracking is controlled by detecting this difference output in a tracking servo circuit in the controlling device 6 and feeding it back to an actuator such as the galvano mirror 37.

In the case of providing the header pits 31 between the guide grooves, as is shown in FIG. 3b, the light spot is situated at the center between the guide grooves. In this case, the polarity of the difference output of the divided photodetector 57 is reversed before it is fed back to an actuator such as the galvano mirror 37. That is, when the light spot is between the guide grooves, namely, when the light spot spreads over two guide grooves, the interference patterns caused by diffraction is generated on the divided photodetector 57 similarly to the case shown in FIG. 3a. But when the symmetry of the interference patterns is decreased due to tracking deviation, the distribution of intensity in the case of the light spot being on the guide groove is inverse to that in the case of the light spot being between the guide grooves. This neccessitates the inversion of the polarity of the difference output. In the experiments undertaken by the inventors, under the conditions that a track pitch is 1.6 μm and the diameter of a light spot is about 1.8 μm as illustrated in FIG. 3b, the sensitivity to detection of tracking control was almost the same in the guide groove as it was between the guide grooves, and stability of tracking control was similarly ensured.

To guard against a large movement of a light spot in the radial direction of the disc, a carriage motor 47 is driven such as to move the whole of the magneto-optic head 3.

A header signal is obtained from the sum output of the divided photodetector 57. The photodetector 57 may be divided into three such that a header signal is obtained from the detecting element at the center, and a tracking signal is obtained from the difference output from the detection elements on both sides.

An apparatus according to the invention need not be restricted to this embodiment. Many tracking deviation detection methods and focus deviation detection methods have already been proposed, any of which can be applied to this apparatus. For example, as is disclosed in U.S. Pat. No. 4,293,944, a single detection system using a combination of a cylindrical lens and a four-division type photodetector can detect a header signal, a focal signal and a tracking signal. In this case, the four-division type detector serves also as a header signal reader, a focal signal detector and a tracking signal detector.

The degree of modulation of a header signal is not less than 40–60 dB higher than that of the data signal obtained by utilizing the magneto-optic effect, which enables the header signal to be read with a good S/N ratio.

On the other hand, as a method for reproducing a data signal with a good S/N ratio, there is a differential detection method. This method, however, cancels a header signal too completely for it to be read. In addition, this method, in which a magneto-optic signal is read out from a differential and a header signal is read out from an in-phase complicates a process circuit.

Since a header signal and a data signal is each different in its detection method and the level of the signal, it is advantageous to provide their respective detection systems in the manner shown in this embodiment.

Hence there is the problem of equalizing the levels of a header signal and a data signal. An example of handling this problem is shown in FIGS. 7a and 7b.

Figure 7A:
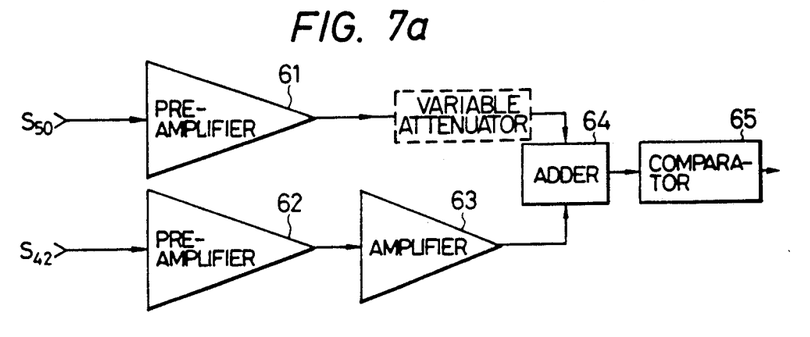
FIGS. 7a and 7b are block diagrams showing examples of level adjustment circuits.

Referring to FIG. 7a, the symbols $S_{50}$, $S_{42}$ are a header signal (e.g. sum output from the divided photodetector 57) and a data signal (e.g. output from the photodetector 42). The numerals 61 and 62 represent pre-amplifiers for converting the photo-current signal detected by the photodetector into voltages respectively. As described above, since the level of a data signal $S_{42}$ is lower than that of a header signal $S_{50}$, the levels of these signals are adjusted by an amplifier 63 for adjusting a gain provided after the pre-amplifier 62.

Conversely, if the S/N ratios in the pre-amplifiers 61, 62 are secured adequately, a variable attenuator may be provided after the pre-amplifier 61 so as to adjust the levels of the signals. The numeral 64 denotes a circuit for adding each signal which has been processed in this way. A simple method is to utilize an adder using a computing amplifier. The referential numeral 65 is a converting circuit, which converts output of the adder 64 into logic level signal, which uses an analog comparator.

Figure 7B:
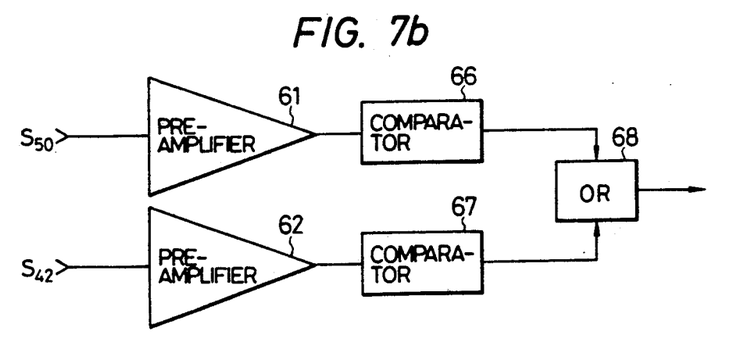

FIG. 7b will next be explained. The structure up to the pre-amplifiers 61, 62 is the same as in FIG. 7a. But, this example is different from the one shown in FIG. 7a in that the levels of the signals are not adjusted in the state of analog signals and, after each signal is converted to a logic level signal by analog comparators 66, 67, respectively, both signals are synthesized by an OR gate 68. Seeing that if the S/N ratio of a signal itself is secured adequately, a logic level signal is easier to be processed than an analog signal, the example shown in FIG. 7b is more advantageous than that shown in FIG. 7a.

Further, an apparatus according to the invention can be applied to an optical disc exclusively for reproduction and a conventional non-erasable pit recording type optical disc by using a signal detected by the header signal detection system 50 as the data of a data portion as well as of a header portion. Accordingly, an apparatus for magneto-optical disc memory according to this invention can handle three kinds of optical disc, namely a magneto-optical disc, non-erasable optical disc and an optical disc exclusively for reproduction.

A master disc cutting apparatus for producing an information recording medium, specifically the record carrier shown in FIG. 3b, will be explained in the following.

Figure 8:
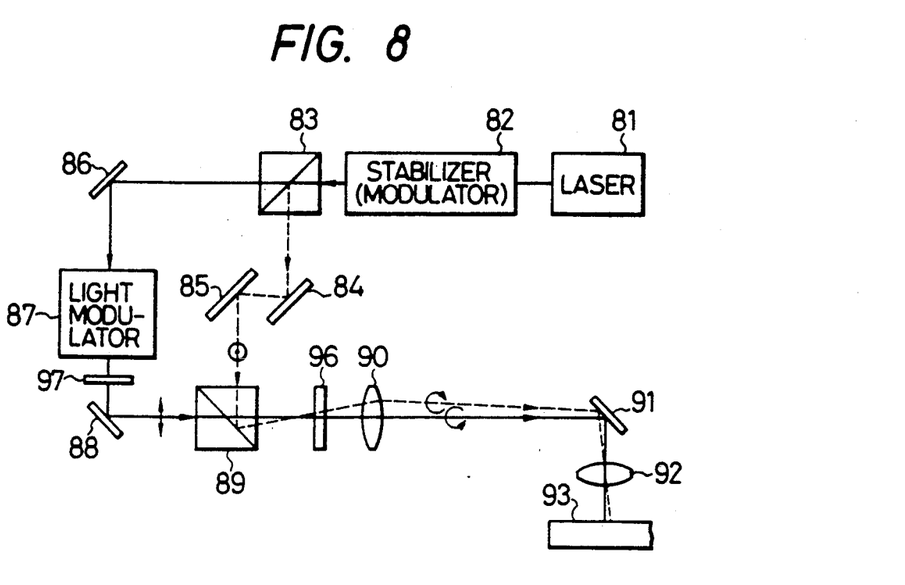
FIG. 8 is a block diagram showing an embodiment of a master disc cutting apparatus according to the invention.

FIG. 8 shows an embodiment of a master disc cutting apparatus according to the invention. A laser beam having linearly polarized light emerging from an Ar laser 81 enters a modulator 82, where the intensity is modulated such as to be proportional to the radius of the incident point of the laser beam on a glass disc 93 with photoresist applied. This laser beam is divided into two by a beam splitter 83. One beam is converted into a pulsed laser beam in correspondence with a header portion pit forming signal by an optical modulator 87. Thereafter it becomes linearly polarized light with the direction of polarization rotated 90° through a halfwave plate 97, and enters a polarization beam splitter 89. In the Figure, the direction of the polarization is parallel to the plane of the drawing. The other beam from the beam splitter 83, which has polarized light vertical to the plane of the drawing, is reflected by reflecting mirrors 84, 85 and enters the polarization beam splitter 89 to be reflected. The above two laser beams which form a slight angle with each other, passes through a quarter-wave plate 96 to become two beams of circular polarized light rotating in the opposite direction to each other, are converged by a lens 90, enter a focussing lens 22 and form an image on a photoresist surface of the glass disc 93. The quarter-wave plate 96 is provided so as to prevent the reflected light from the glass disc 93 from entering the laser 81. The numerals 86, 88, 91 denote reflecting mirrors. When the track pitch is 1.6 μm, if the focussing lens 92 with a numerical aperture of 0.90 is used, the angle formed by the two laser beams entering the focussing lens 92 is about 0.02° in the case of situating the header signal pits 31 approximately in the center of the guide groove. Therefore, the inclinations of the reflecting mirrors 84, 85 are adjusted such that the two laser beams form this angle and enter the center of the focussing lens 92. In this embodiment, a continuous guide groove 2 is obtained on both sides of the header signal pits 31.

Figure 9:
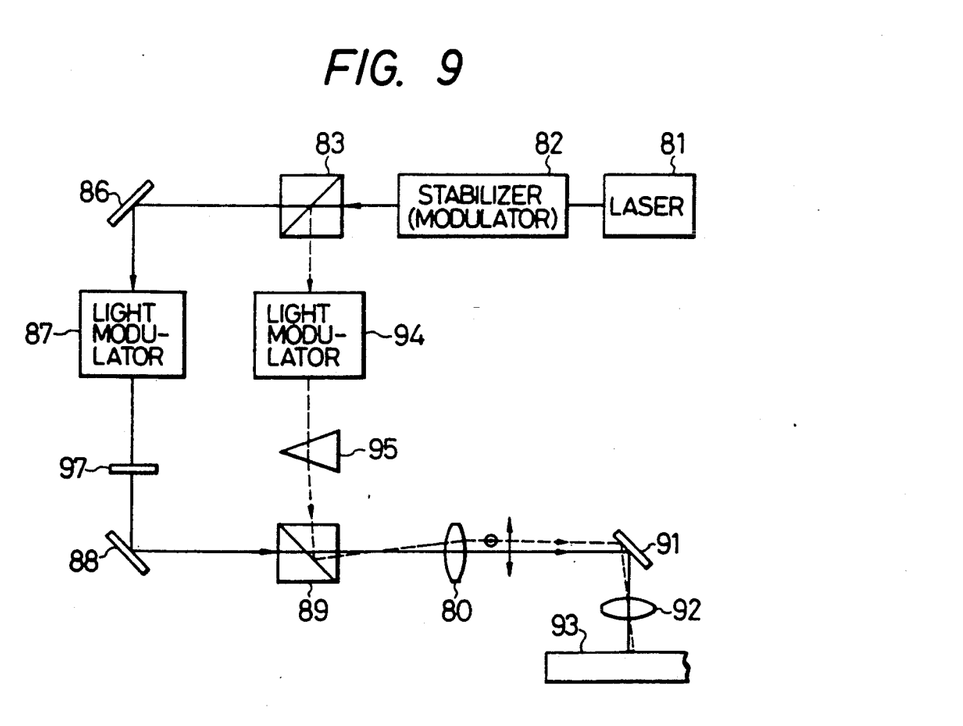
FIG. 9 is a block diagram showing another embodiment of a master disc cutting apparatus according to the invention.

In FIG. 9 is shown another embodiment of a master disc cutting apparatus according to the invention. This is different from the embodiment shown in FIG. 8 in that another light modulator 94 is provided on the optical path of the latter laser beam, which allows the configuration of the guide groove 2 to be intermittent as desired. In addition, a prism 95, in place of the reflecting mirrors 84, 85, gives an inclination to the laser beam. If the incident angle to the focussing lens 92, which is constant, and the magnification of the lens 90 are known, an easier and more stable formation of an optical path is enabled by selecting an appropriate vertical angle of the prism 95.

This example omits the quarter-wave plate 96 shown in FIG. 8, and the laser beams form linearly polarized light the polarization direction of each of which crosses the other at right angles. It is possible to prevent the reflected light from returning to the laser 81 by shifting the incident angle of the two laser beams in relation to the focussing lens a little away from 90°.

A cutting apparatus according to the invention makes it possible to easily and stably form a pattern of guide grooves and header signal pits simultaneously. In the experiments of the inventors, an information recording medium with header signal pits formed between the guide grooves, which was produced with this cutting apparatus, reduced the noise level by about 3 dB and heightened the signal level by about 1 dB as compared with a recording medium with header signal pits formed on the guide groove.

What is claimed is:

1. An optical information memory apparatus comprising:
   a record carrier for recording, reproducing and erasing information including:
   a circular disc-like substrate,
   a recording layer which is formed on said substrate and used for recording information by change of a direction of magnetization thereof, and
   a guide groove of a plurality of tracks formed in advance and extending in the radial direction with intervals,
   each track being divided into a plurality of sectors, each of which includes a header portion in which a header signal containing an address for distinguishing at least said sector is formed in advance with pits of a phase structure and a data portion adjacent to said header portion, and
   said guide groove serving as an optical guide for a light beam which records, reproduces and erases information onto said data portion;
   an optical head which is movable relative to said record carrier in the radial direction of said record carrier for providing said light beam for enabling at least one of recording, reproducing and erasing of said information;
   an optical system for converging said light beam onto said recording layer of said record carrier,
   a means for applying a magnetic field to said recording layer for at least enabling recording of said information;
   a first detection system for detecting the intensity of the light beam from said recording layer, and
   a second detection system for detecting the direction of polarization of the light beam from said recording layer;
   a level adjustment circuit which is connected to said first and second detection circuits and adjusts the levels of a header signal in said header portion which is detected by said first detection system and a data signal in said data portion which is detected by said second detection system.

2. An optical information memory apparatus according to claim 1, wherein said first detection system includes a track deviation detection system for detecting a tracking signal by utilizing the diffraction of the reflected light from said recording layer, and a focus deviation detection system for detecting said focal signal by utilizing the astigmatism of reflected light from said recording layer, such that said header signal is detected from the output from said tracking deviation system.

3. An optical information memory apparatus according to claim 2, wherein said tracking deviation detection system is composed of a lens for converging said reflected light and a photodetector which is divided into at least two and which converts the light from said lens into electrical signal, and said tracking signal and said header signal are detected from the output of said photodetector.

4. An optical information memory apparatus comprising:
   a record carrier for recording, reproducing and erasing information including:
   a circular disc-like substrate,
   a recording layer which is formed on said substrate and used for writing information by changing a direction of magnetization thereof, and
   a guide groove of a plurality of tracks formed in advance and extending in the radial direction with intervals,
   each track being divided into a plurality of sectors, each of which includes a header portion in which a header signal containing an address for distinguishing at least said sector is formed in advance with pits of a phase structure and a data portion adjacent to said header portion, and
   said guide groove serving as an optical guide for a light beam which records, reproduces and erases information onto said data portion;
   an optical head which is movable relative to said record carrier in the radial direction of said record carrier for irradiating said light beam for enabling at least one of recording, reproducing and erasing of said information, and which includes:
   an optical system for converging said light beam onto said recording layer of said record carrier,
   a coil means for applying a magnetic field to said recording layer for at least enabling recording of said information;
   a first detection system for detecting the intensity of the light beam from said recording layer, and
   a second detection system for detecting the direction of polarization of the light beam from said recording layer;
   a tracking servo circuit which is connected to said first detection system and produces a tracking signal for controlling the position of irradiation of said light beam in the radial direction of said record carrier;
   a focussing servo circuit which is connected to said first detection system and produces a focal signal for controlling said light beam such that said light beam converges onto said recording layer; and
   a level adjustment circuit which is connected to said first and second detection circuits and adjusts the levels of a header signal in said header portion which is detected by said first detection system and a data signal in said data portion which is detected by said second detection system.

5. An optical information memory apparatus according to claim 4, wherein said second detection system is composed of an analyzer for selecting predetermined components of polarized light from the light beam reflected from said recording layer, and a photodetector for converting the light from said analyzer into an electrical signal.

6. An optical information memory apparatus according to claim 4, wherein said first detection system includes a track deviation detection system for detecting a tracking signal by utilizing the diffraction of the reflected light from said recording layer, and a focus deviation detection system for detecting said focal signal by utilizing the astigmatizm of reflected light from said recording layer, such that said header signal is detected from the output from said tracking deviation detection system.

7. An optical information memory apparatus according to claim 6, wherein said tracking deviation detection system is composed of a lens for converging said reflected light and a photodetector which is divided into at least two and which converts the light from said lens into electrical signal, and said tracking signal and said header signal are detected from the output of said photodetector.

8. An optical information memory apparatus according to claim 6, wherein said focus deviation detection system is composed of an aspheric optical system for producing astigmatizm on said reflected light, an optical element for obstructing part of the light from said aspheric optical system, and a photodetector which is divided into at least two, and said focussing servo circuit detects said focal signal from the output from said photodetector.

9. An optical information memory apparatus according to claim 4, wherein said level adjustment circuit is composed of:
   first and second pre-amplifiers for converting said header signal which is detected by said first detection system and said data signal which is detected by said second detection system into voltage;
   either of a variable attenuator which is connected to said first pre-amplifier and a gain controllable amplifier which is connected to said second pre-amplifier;
   an adder which is connected to either of said variable attenuator and said amplifier and to either of said first and second pre-amplifiers and for providing an added output; and
   a comparator for converting the output of said adder to a binary signal.

10. An optical information memory apparatus according to claim 4, wherein said level adjustment circuit is composed of:
    first and second pre-amplifies for converting said header signal which is detected by said first detection system and said data signal which is detected by said second detection system into voltage;
    first and second comparators which are connected to said first and second pre-amplifiers and convert the outputs thereof to the binary signals respectively; and
    a circuit for synthesizing the outputs from said two comparators.

11. An optical information memory apparatus according to claim 4, further:
    a semiconductor laser which is used as a light source for irradiating said light beam; and
    a light beam transform optical system for converting the laser beam from said semiconductor laser into a parallel beam having an approximately circular section.

* * * * *